(12) United States Patent
Aboutalib

(10) Patent No.: US 7,536,365 B2
(45) Date of Patent: May 19, 2009

(54) HYBRID ARCHITECTURE FOR ACQUISITION, RECOGNITION, AND FUSION

(75) Inventor: Omar Aboutalib, Diamond Bar, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/297,679

(22) Filed: Dec. 8, 2005

(65) Prior Publication Data

US 2008/0162389 A1   Jul. 3, 2008

(51) Int. Cl.
*G06N 5/00*   (2006.01)
(52) U.S. Cl. .......................... 706/15; 706/45
(58) Field of Classification Search .................... 706/15, 706/45
See application file for complete search history.

(56) References Cited

U.S. PATENT DOCUMENTS

| | | | | |
|---|---|---|---|---|
| 5,123,057 A | * | 6/1992 | Verly et al. ................. | 382/156 |
| 5,341,142 A | * | 8/1994 | Reis et al. ..................... | 342/64 |
| 5,430,445 A | * | 7/1995 | Peregrim et al. ........... | 342/25 C |
| 5,793,888 A | * | 8/1998 | Delanoy ...................... | 382/219 |
| 5,801,970 A | * | 9/1998 | Rowland et al. ............... | 703/6 |
| 5,842,156 A | * | 11/1998 | Hong et al. .................. | 702/179 |
| 5,842,194 A | * | 11/1998 | Arbuckle ...................... | 706/52 |
| 5,850,625 A | | 12/1998 | Maren et al. | |
| 5,963,653 A | * | 10/1999 | McNary et al. .............. | 382/103 |
| 6,018,728 A | * | 1/2000 | Spence et al. ................ | 706/20 |
| 6,042,050 A | * | 3/2000 | Sims et al. ................... | 244/3.17 |
| 6,072,889 A | * | 6/2000 | Deaett et al. ................ | 382/103 |
| 6,263,103 B1 | * | 7/2001 | Freeman et al. ............. | 382/173 |
| 6,324,532 B1 | * | 11/2001 | Spence et al. .................. | 706/27 |
| 6,400,306 B1 | | 6/2002 | Nohara et al. | |
| 6,724,916 B1 | | 4/2004 | Shyu | |
| 6,754,390 B2 | | 6/2004 | Dobeck | |
| 6,801,662 B1 | * | 10/2004 | Owechko et al. ............ | 382/224 |
| 7,016,916 B1 | * | 3/2006 | Lee et al. ................. | 707/103 R |
| 7,110,602 B2 | * | 9/2006 | Krause ........................ | 382/199 |
| 7,136,505 B2 | * | 11/2006 | Wenzel et al. ............... | 382/103 |
| 2002/0110279 A1 | | 8/2002 | Dobeck | |
| 2002/0184235 A1 | * | 12/2002 | Young et al. ............. | 707/104.1 |
| 2003/0018928 A1 | * | 1/2003 | James et al. .................. | 714/25 |
| 2003/0184468 A1 | | 10/2003 | Chen et al. | |
| 2003/0186663 A1 | | 10/2003 | Chen et al. | |
| 2003/0228035 A1 | | 12/2003 | Parunak et al. | |
| 2004/0174822 A1 | | 9/2004 | Bui | |
| 2006/0072816 A1 | * | 4/2006 | Szajnowski et al. ......... | 382/168 |
| 2006/0204107 A1 | * | 9/2006 | Dugan et al. ................ | 382/217 |

OTHER PUBLICATIONS

Ikeuchi et al. "Invariant Histograms and Deformable Template Matching for SAR Target Recognition". 1996, IEEE. pp. 100-105.*

* cited by examiner

*Primary Examiner*—Wilbert L Starks, Jr.
(74) *Attorney, Agent, or Firm*—Robert P. Lenart, Esq.; Pietragallo Gordon Alfano Bosick & Raspanti, LLP

(57) ABSTRACT

A method comprises the steps of: producing one or more signals representative of a feature of a target or area of interest, statistically processing the signals to produce one or more first hypotheses of the target or area of interest, comparing the first hypotheses to one or more templates in a template library to produce one or more second hypotheses, and comparing the second hypotheses to one or more models in a model library to produce a target decision. An apparatus that performs the method is also provided.

19 Claims, 9 Drawing Sheets

HYBRID ARCHITECTURE FOR ACQUISITION, RECOGNITION, AND FUSION

FIELD OF THE INVENTION

This invention relates to target detection and acquisition systems, and more particularly to such systems that use electro-optical, infrared, and/or synthetic aperture radar sensors.

BACKGROUND OF THE INVENTION

Traditional target detection and recognition techniques use a single statistical, template matching, or model-based algorithm. Statistical approaches such as neural networks, decision trees, and fuzzy logic have the advantage of low data throughput requirements but suffer from the fact that one statistical algorithm is not capable of learning about a large target set under all sensing conditions. Template matching approaches outperform statistical approaches but require a large throughput to match the sensed target signature to all pre-stored target templates at all aspect angles. Model-based approaches outperform template matching approaches but require excessive throughput due to the need for real-time rendering of all pre-stored target models for all potential orientations and matching with the sensed signature.

There is a need for a target detection and recognition system that overcomes the limitations of prior systems.

SUMMARY OF THE INVENTION

This invention provides a method comprising the steps of: producing one or more signals representative of a feature of a target or area of interest, statistically processing the signals to produce one or more first hypotheses of the target or area of interest, comparing the first hypotheses to one or more templates in a template library to produce one or more second hypotheses, and comparing the second hypotheses to one or more models in a model library to produce a target decision.

In another aspect, the invention provides an apparatus comprising a plurality of sensors for producing one or more signals representative of a feature of a target or area of interest, and a processor for statistically processing the signals to produce one or more first hypotheses of the target or area of interest, for comparing the first hypotheses to one or more templates in a template library to produce one or more second hypotheses, and for comparing the second hypotheses to one or more models in a model library to produce a target decision.

The invention further encompasses an apparatus comprising means for producing one or more signals representative of a feature of a target or area of interest, means for statistically processing the signals to produce one or more first hypotheses of the target or area of interest, means for comparing the first hypotheses to one or more templates in a template library to produce one or more second hypotheses, and means for comparing the second hypotheses to one or more models in a model library to produce a target decision.

DETAILED DESCRIPTION OF THE INVENTION

This invention provides a method and apparatus for target detection and recognition, termed a Hybrid Architecture, Acquisition, Recognition and Fusion (HAARF) system. The HAARF uses a multi-layered hybrid approach of statistical, template and model-based classifiers with a focusing mechanism that provides model-based performance with reduced throughput requirements. The HAARF system combines the advantages of the statistical, template matching, and model-based techniques while avoiding their respective limitations.

Figure 1:
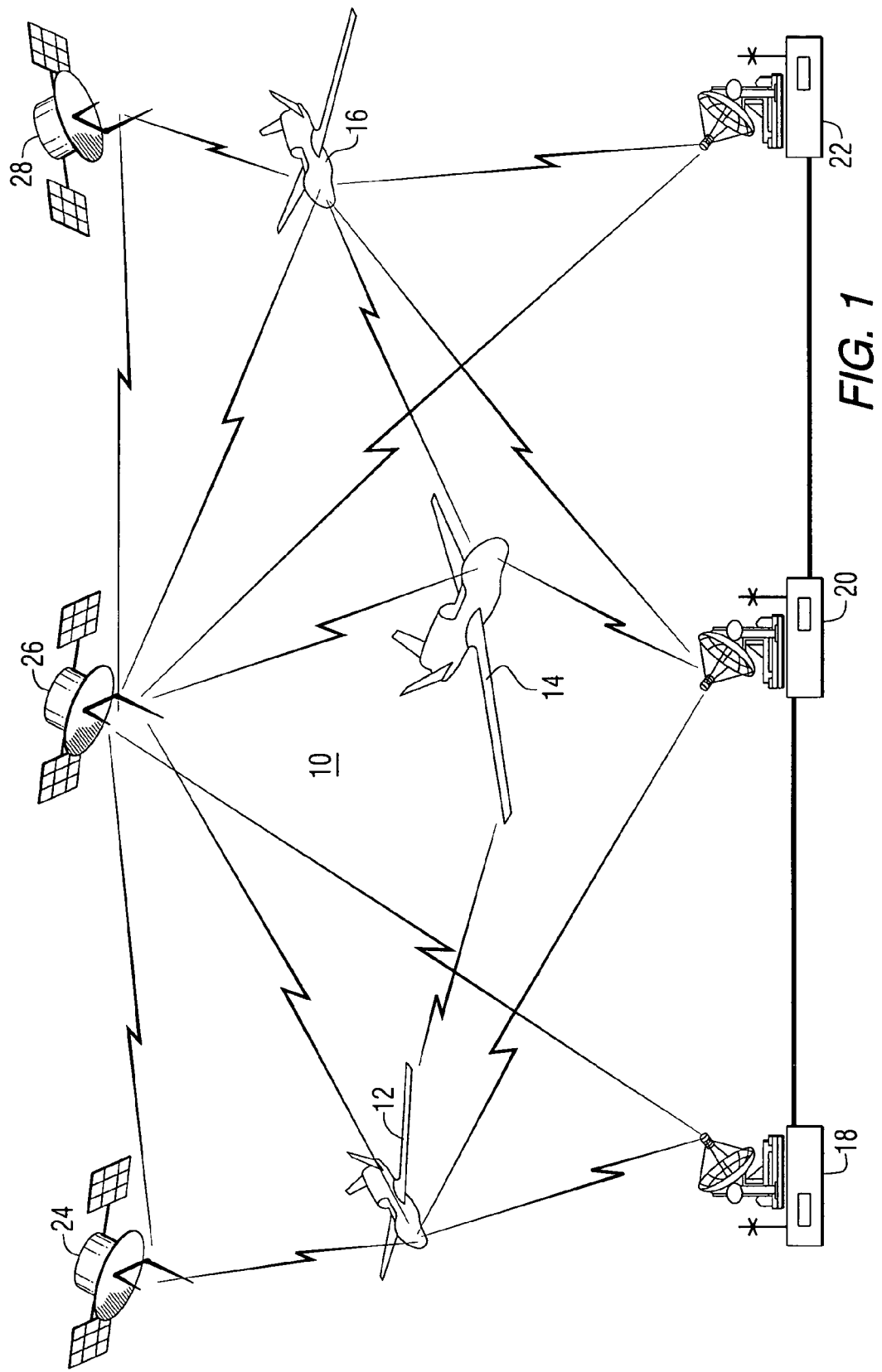
FIG. 1 is a schematic representation of a system that can include the method and apparatus of the invention.

FIG. 1 is a schematic representation of a surveillance system 10 that can include the target detection and recognition system of this invention. The surveillance system in this example includes a plurality of air vehicles (which can be manned or unmanned) 12, 14 and 16. Each of the air vehicles carries one or more sensors for supplying information about an area and/or target of interest. The air vehicles can communicate with a plurality of ground stations 18, 20 and 22, and a plurality of satellites 24, 26 and 28. Communication links are provided among the various system components to achieve the desired functionality. Information produced by the sensors must be processed so that decisions can be made based on that information. When multiple sensors provide information about a common target and/or a common area of interest, that information from the sensors can be combined, or fused, to produce more reliable information.

Figure 2:
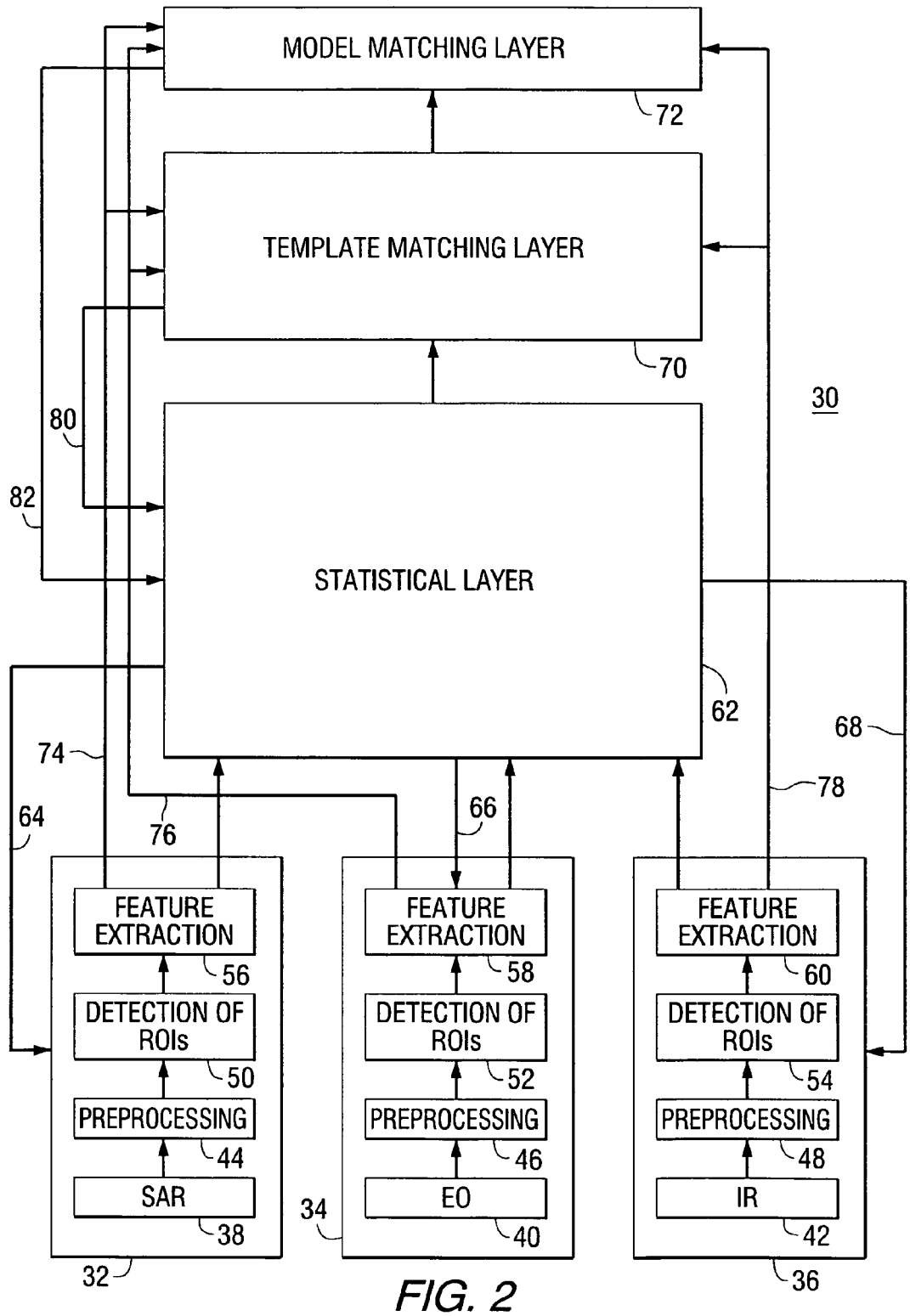
FIG. 2 is a block diagram of a target detection and recognition system constructed in accordance with the invention.

FIG. 2 is a block diagram of a target detection and recognition system constructed in accordance with the invention. The system includes sensor processing circuitry 32, 34 and 36, having a plurality of sensors, including in this example, a synthetic aperture radar 38, and electro-optical sensor 40 and an infrared sensor 42. Signals from the sensors are subject to pre-processing as illustrated by blocks 44, 46 and 48. The resulting pre-processed signals are further processed to detect regions of interest as shown by blocks 50, 52 and 54. Features of interest are then identified in the regions of interest as illustrated by blocks 56, 58 and 60. The features are processed in a statistical layer 62, a template matching layer 70, and a model matching layer 72, to identify targets in the region of interest.

Various types of features can be extracted for each layer. For example, the features extracted for the statistical layer encompass geometric features such as the area of the region of interest (ROI), the aspect ratio of the ROI, moment-based features, fractal-based features, and wavelet-based features.

Table 1 illustrates a subset of the features that may be extracted for the statistical layer shown in the diagram of FIG. 2.

TABLE 1

Statistical Layer Features

Percentile

1. Percentile70
2. Percentile90

Geometric

3. Geometric Area
4. Geometric Raw Area
5. Geometric Perimeter
6. Geometric Linear Perimeter
7. Geometric Lambda Ratio
8. Geometric Roundness
9. Geometric Compactness
10. Geometric Rectangularity
11. Geometric Thinness
12. Geometric Thinness Ratio
13. Geometric Skewness
14. Geometric Asymmetry
15. Geometric Difference
16. Geometric Squareness
17. Geometric Squarity
18. Geometric Ellipseness
19. Geometric Convexity
20. Geometric Norm Perimeter
21. Geometric Aspect Ratio
22. Geometric Speckles Baseline 23. Baseline Geo 1
24. Baseline Geo 2
25. Baseline Geo 3
26. Baseline Geo 4
27. Baseline Geo 5

Central Moments

28. Central Moments 1 1
29. Central Moments 2 0
30. Central Moments 0 2
31. Central Moments 2 2

Invariant Moments

32. Invariant Moments 2 0
33. Invariant Moments 0 2
34. Invariant Moments 2 2

Radial Moments

35. Radial Moment 1 0
36. Radial Moment 0 1

Hu Moments

37. Hu Moment 1
38. Hu Moment 2
39. Hu Moment 3
40. Hu Moment 4
41. Hu Moment 5
42. Hu Moment 6
43. Hu Moment 7

Fourier

44. Fourier 2
45. Fourier 4
46. Fourier 8

Upsilon

47. Upsilon 1
48. Upsilon 2
49. Upsilon 3
50. Upsilon 4

Fractal

51. Fractal Mensuration
52. Fractal Correlation
53. Fractal Surface

Pseudo Peak

54. Pseudo Peak Count
55. Pseudo Peak Standard Deviation

TABLE 1-continued

Statistical Layer Features

56. Pseudo Peak Max
57. Pseudo Peak Min
58. Pseudo Peak Max Distance
59. Pseudo Peak X Dim
60. Pseudo Peak Y Dim Features used in the template layer can include edge-based templates representing various types of edges that can be extracted from the ROI, boundary-based templates representing the ROI boundary that separates the target from the background, segmented-based templates which represent segments of the ROI boundary for handling obscured targets, and region-based templates which represent the contrast distribution in the ROI (for example, a hot spot distribution in the ROI in an IR image).

The extracted features for the model-based layer include the segmented ROI, as it is sensed by the sensor. The selection of the appropriate sets of features depends on the target set, and the statistics of the background clutter. The process of feature selection can be performed off-line using simulated or real data collected under extended operating conditions.

Signals representative of the features of a given ROI are processed using a combination of statistical analysis, template matching and model-based matching. FIGS. 3a, 3b, 3c, 4a, 4b, 4c, 5a, 5b, 5c, 8 and 9 are examples of targets in regions of interest that are used to illustrate how the three layers interact.

Figure 3A:
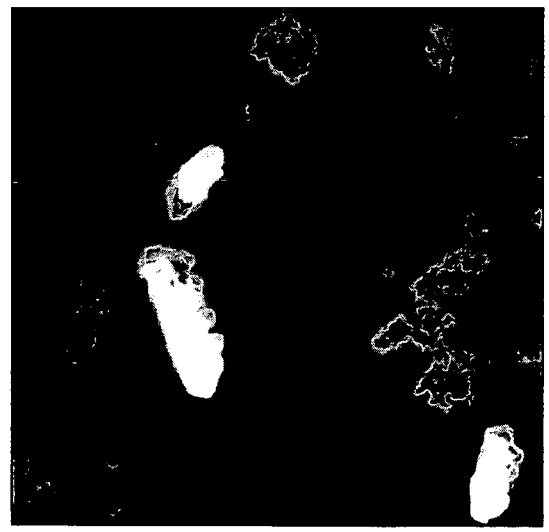
FIGS. 3a, 3b and 3c are images of a region of interest including a target that can be classified using only a statistical decision layer.
Figure 3B:
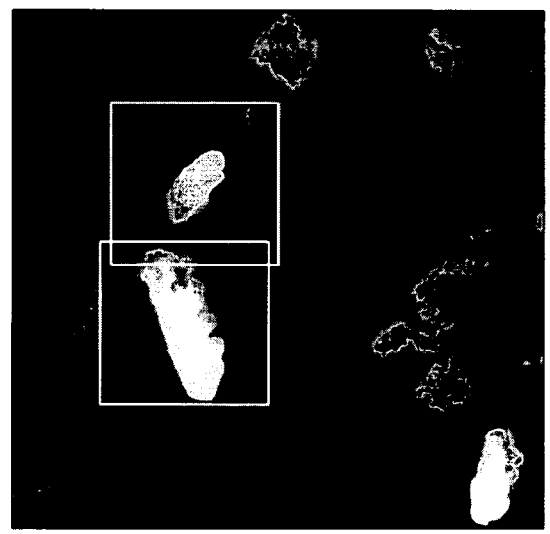

FIG. 3a is an IR image of a region of interest, which includes a SCUD missile and a support vehicle. In this example, the image of the ROI is based on the relative thermal contrast between the target and the background, and the expected target size using a standard Constant False Alarm Rate (CFAR) filter. FIG. 3b shows squares around potential targets that were identified using these features.

Figure 3C:
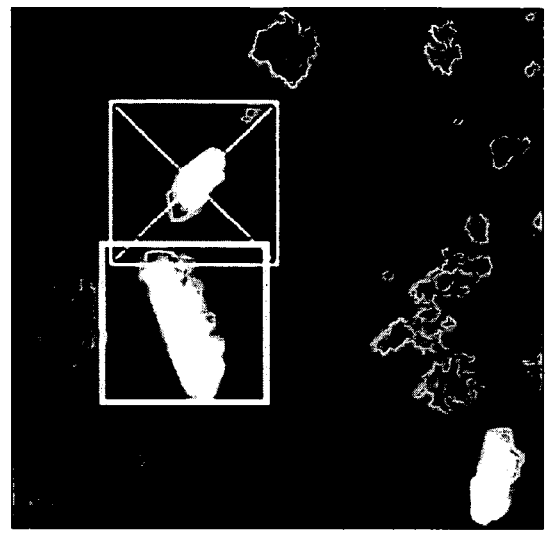

Clutter rejection is performed on the ROI by extracting additional features and using the additional features as input to a two-class classifier trained on the target versus clutter. FIG. 3c represents the output of the clutter rejection process, where the ROI representing the support vehicle is automatically rejected since it is not among a predetermined target set.

Additional classification features are then extracted from the ROI representing the SCUD and used as input to the statistical layer for target classification. The statistical layer outputs various target hypotheses and associated confidence levels. Table 2 provides an example of a list of the best five target hypotheses and associated confidence levels.

TABLE 2

Statistical Analysis Hypotheses

| Target Hypothesis | Probability |
| --- | --- |
| 2S3 | 0.000655 |
| 2S1 | 0.013764 |
| BMP-2 | 0.000126 |
| SCUD | 0.989044 |
| ZSU-23 | 0.000000 |

As shown in the target hypotheses list of Table 2, the confidence in assigning a SCUD class target to the ROI is 0.98. This example assumes that, based on predetermined Rules-Of-Engagement (ROE), the correct classification threshold before committing a weapon on any target is 95% or higher. In this case, the statistical layer produced a confidence level higher than that set by the ROE. The target aspect (or orientation) was also estimated as 36.30 degrees or 180+36.30=216.30 degrees using the extracted geometrical features. 180 degrees were added to 36.30 degrees since the classifier cannot discriminate the front from the back of the target.

In this example the template layer is exercised, for conformation only, by matching templates of a SCUD around 36.30 and 216.30 degrees. The results of template matching are shown in Table 3, which confirms the decision made by the statistical layer.

TABLE 3

Template Matching Hypothesis

| Target Hypothesis | Probability |
|---|---|
| SCUD | 0.914855 |

Then the final classification for the target is a SCUD missile with a target aspect 221.30, which is critical for aim point selection.

Figure 4C:
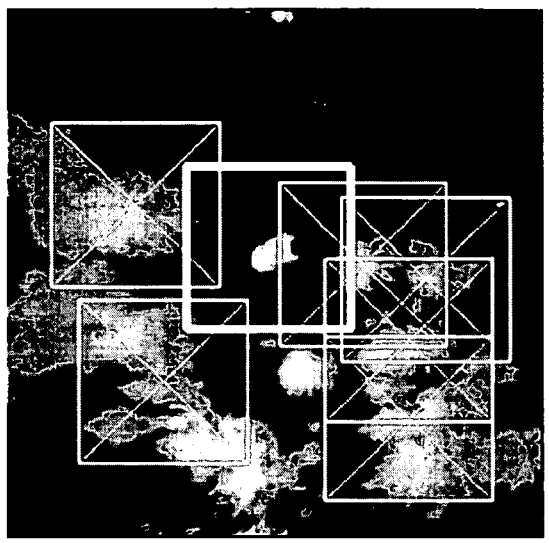
FIGS. 4a, 4b and 4c are images of a region of interest including a target that required both the statistical and template decision layers.
Figure 4B:
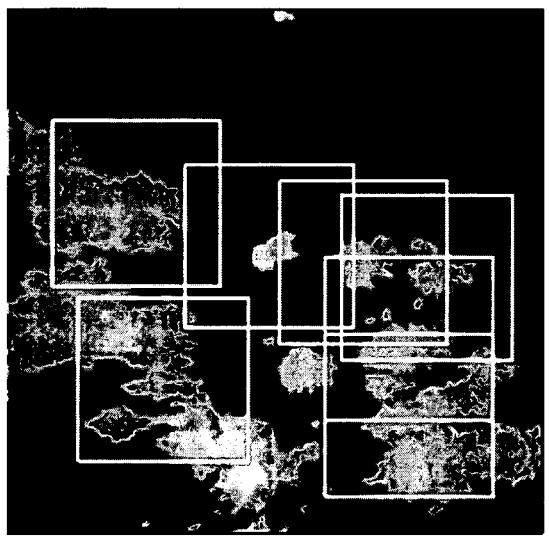
Figure 4A:

FIGS. 4a, 4b and 4c are images of a region of interest for an example of classification of a target that required both the statistical and template decision layers. The images of FIGS. 4a, 4b and 4c represent a region of interest having a Zil131 truck target. FIG. 4a shows the original image. FIG. 4b shows the image with potential targets identified by squares. FIG. 4c shows the image after clutter rejection, with a single potential target having been identified for further analysis.

Features in the selected portion of the image of FIG. 4c were processed in the statistical layer. The output of the statistical layer is shown in Table 4.

TABLE 4

Statistical Analysis Hypotheses

| Target Hypothesis | Probability |
|---|---|
| Bm21 | 0.575238 |
| Bmp1 | 0.167349 |
| Bmp2 | 0.003859 |
| T72m | 0.000035 |
| Zil131 | 0.946574 |

The target aspect (or orientation) was estimated as 107.30 degrees or 180+107.30=287.30 degrees using the extracted geometrical features. 180 degrees were added to 107.30 degrees since the classifier cannot discriminate the front from the back of the target.

It is evident from inspecting the confidence levels of the target hypotheses in Table 4 that the Zil131 class confidence is the highest, but it is smaller than the required threshold level of 95% set by the ROE. The statistical layer is then triggered and used to focus the template layer by providing the template layer with the best three target hypotheses Zil131, Bm21, and Bmp1, along with associated estimates of the aspect angles. This information is used to focus the template matching process. With this additional information, the template layer produces a classification output of Zil131 and an associated confidence level as shown in Table 5.

TABLE 5

Template Matching Hypothesis

| Target Hypothesis | Probability |
|---|---|
| Zil131 | 0.988758 |

Then the final classification for the target is a Zil131 truck.

Figure 5C:
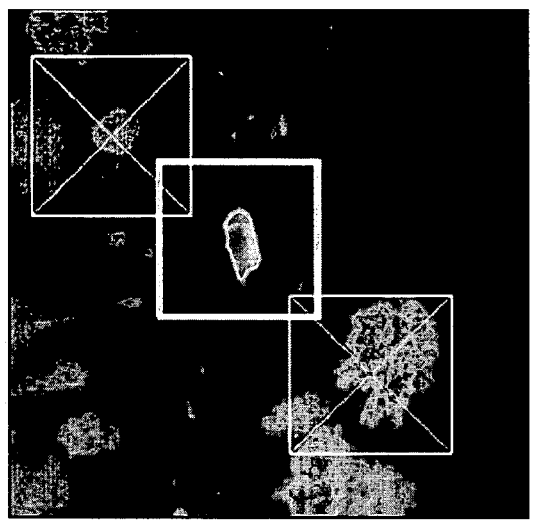
FIGS. 5a, 5b and 5c are images of a region of interest including a target that required three decision layers.
Figure 5B:
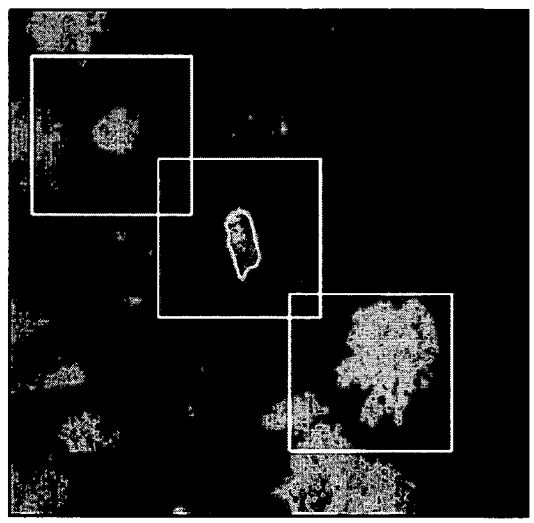
Figure 5A:
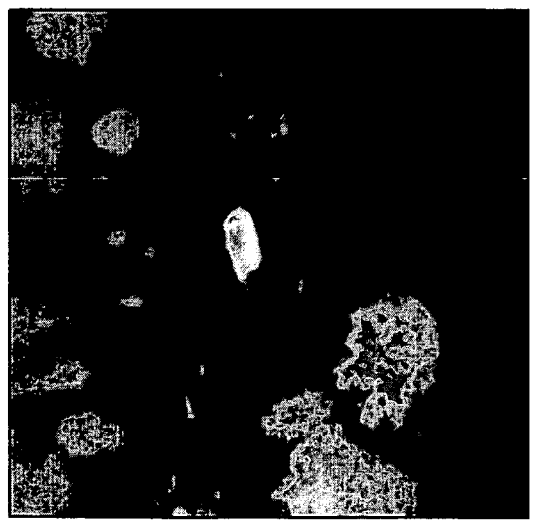

FIGS. 5a, 5b and 5c are images of a region of interest for an example of classification of a target that required three decision layers. The images of FIGS. 5a, 5b and 5c show regions of interest including a T72m tank. In this example, all three layers of FIG. 2 are exercised.

The output of the statistical layer is shown in Table 6.

TABLE 6

Statistical Analysis Hypotheses

| Target Hypothesis | Probability |
|---|---|
| Bm21 | 0.000971 |
| Bmp1 | 0.000488 |
| Bmp2 | 0.747207 |
| T72m | 0.629825 |
| Zil131 | 0.000002 |

The target aspect (or orientation) was estimated as 197.30 degrees or 180+197.30=377.30 degrees using the extracted geometrical features. 180 degrees were added to 197.30 degrees since the classifier cannot discriminate the front from the back of the target.

It is evident from inspecting the confidence levels of the target hypotheses in Table 6 that the T72m class confidence is smaller than the required threshold level of 95% set by the ROE.

Then the statistical layer is triggered and used to focus the template layer. The output of the template layer, as shown in Table 7, includes three target hypotheses Bmp2, T72m, and Bm21.

TABLE 7

Template Matching Hypotheses

| Target Hypothesis | Probability |
|---|---|
| Bmp2 | 0.951285 |
| T72m | 0.981179 |
| Bm21 | 0.916606 |

The first two hypotheses exceed the required confidence level of 95%. The template layer then triggers and focuses the model-based layer to resolve the ambiguity by requesting the matching of only two target hypotheses at specific target aspects. The model-based layer matches the T72m with a higher confidence as shown in Table 8.

TABLE 8

Model Matching Hypothesis

| Target Hypothesis | Probability |
|---|---|
| Bmp2 | 0.946658 |
| T72m | 0.968173 |

The final correct target classification is then a T72m tank, with an aspect of 209.30.

It should be noted, as shown in FIG. 2, that there is feedback among the various layers. For example, if the template matching layer could not match on the target hypotheses received from the statistical layer, then it sends a feedback message to the statistical layer to send the second best target hypotheses for a potential match. Similarly, if the model-based layer could not match on the target hypotheses received from the template layer, then a feedback message to the template layer (and potentially the statistical layer) is sent requesting the second best target hypotheses. The statistical layer also provides feedback to the detection and feature extraction processes to lower the detection threshold and extract additional features to resolve potential ambiguities.

As shown in FIG. 2, statistical processing is performed in a statistical layer 62 that receives the extracted feature information. Lines 64, 66 and 68 show that the statistical layer can send signals to the sensor processing circuitry. The statistical layer uses multiple statistical automatic target cueing/automatic target recognition (ATC/ATR) algorithms, such as artificial neural networks (ANN), decision trees (DT), or fuzzy logic (FL) to process the feature information. The statistical layer also provides location estimates for all ROIs in terms of Latitude and Longitude (Lat/Long) using the known position of the platform (Lat/Long), as well as the height and sensor lookdown angles.

Decision-level fusion of the outputs of the statistical processing algorithms can be performed using a modified Dempster Shafer process, Bayesian formulation, or other known fusion techniques. Multi-sensor feature-level fusion is also performed by concatenating features from multiple sensors into one feature vector, which is used as an input to a multi-sensor composite classifier. Decision-level fusion for temporal evidence accumulation can also be performed by fusing classification decisions made on a given target over time to enhance classification confidence.

The statistical layer focuses the template matching and model-based matching ATC/ATR as shown in FIG. 2 and the examples described above. The statistical layer produces multiple hypotheses and orientation estimates that are subsequently used for template matching as shown in block 70. The template matching layer includes multiple template matching and decision fusion. A determination is made as to whether a match exists or a matching template is not in the library. Template matching is used to focus the model-based matching illustrated in block 72. The model-based matching determines if the data matches a model stored in a model library, or a matching model is not in the library. The template matching and model matching receive the extracted feature information as shown by lines 74, 76 and 78. The results of the template matching and model matching can be sent back to the statistical layer as illustrated by arrows 80 and 82.

Figure 6:
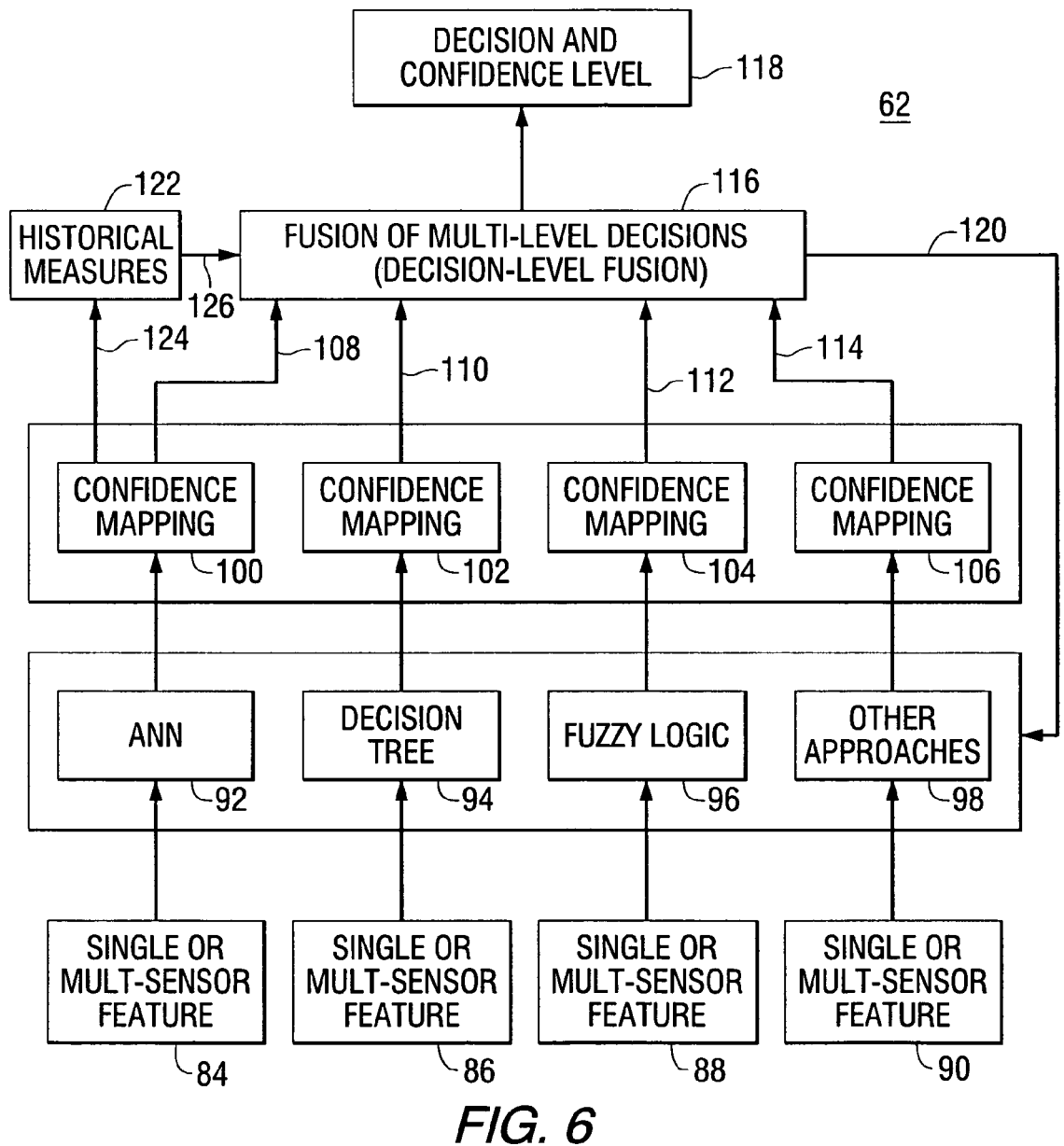
FIG. 6 is a flow diagram that illustrates the information processing in the system of FIG. 2.

FIG. 6 is a block diagram of an example of the statistical layer 62. Single or multiple sensors produce feature data as illustrated by blocks 84, 86, 88 and 90. This feature data is processed using various statistical techniques such as an artificial neural network 92, decision tree 94, fuzzy logic 96 or other approach 98. The confidence threshold required to determine a target class depends on target complexity.

Figure 7:
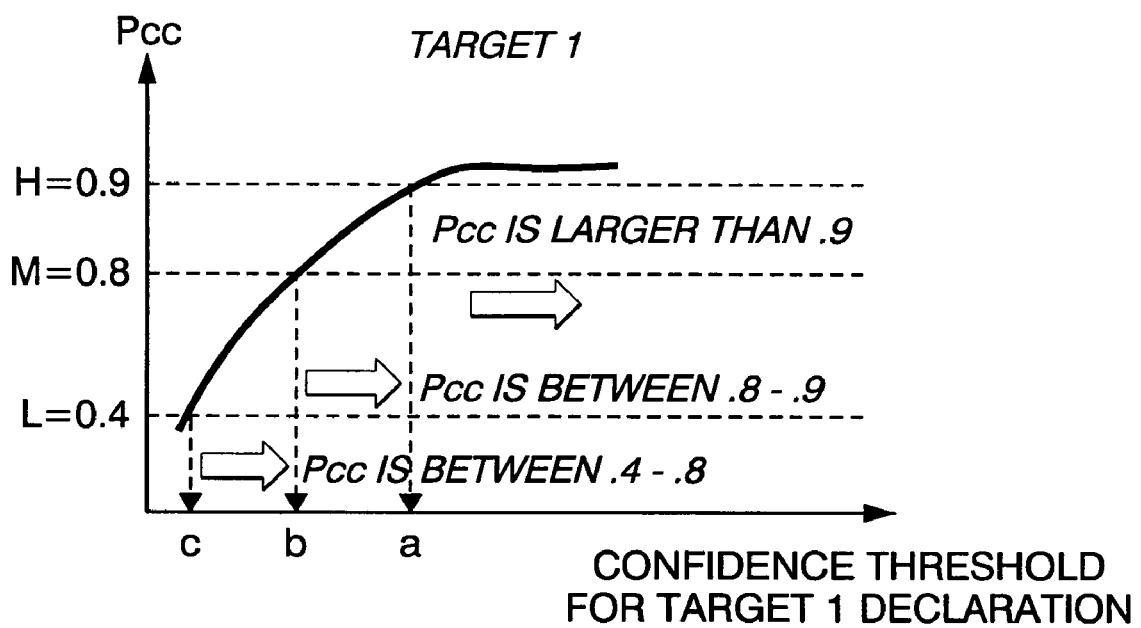
FIG. 7 shows a graph that illustrates the mapping of classification confidence levels to the probability of correct classification.

The choice of the confidence threshold for a given target class depends on the desired probability of correct classification. FIG. 7 shows a graph of the probability of correct classification (Pcc) versus classification confidence. For example, if one desires a probability of correct classification of 90% or higher, then the threshold for such target class will be higher than that for a probability of correct classification between 0.8 and 0.9 or between 0.4 and 0.8 as shown in FIG. 7. The Pcc can be computed for each target during a training process for each classifier, using simulated or real data collected under various target conditions.

During the training process of any classifier, two data sets are formed for all targets. The first set is termed the "training set" and the second set is termed the "testing set". Each set includes a number of target signatures taken for each target from multiple sensor points of views and under various conditions. The training set is used to train the classifier, and the test set is used to test and characterize the performance of the classifier in terms of a confusion matrix.

Table 9 is an example of a confusion matrix.

TABLE 9

Confusion Matrix Example for Target T1

| Pcc | | T1 | T2 | T3 | T4 | T5 | T6 | NL |
|---|---|---|---|---|---|---|---|---|
| High | T1 | 0.95 | 0.01 | 0 | 0.02 | 0 | 0.02 | 0 |
| Medium | T1 | 0.8 | 0.5 | 0 | 0 | 0 | 0.5 | 0.1 |
| Low | T1 | 0.4 | 0.1 | 0 | 0.25 | 0 | 0.15 | 0.1 |

In Table 9, Pcc is the probability of a correct classification. NL means "Not in Library". Each row in the confusion matrix represents the expected performance against a given target as shown in FIG. 7 for Target 1. For example, for a classification confidence above the threshold "a", the corresponding probability of correct classification is 0.9 or higher, and the confusion vector for Target 1 is represented by the first row of Table 9. This means that if Target 1 is present, then there is a probability of 95% that will be classified as Target 1, 1% as Target 2, 2% as Target 4, and 2% as Target 6. The sum of all probabilities across the row of the confusion matrix should add up to 100%. Similarly, the second row of Table 9 represents the confusion vector for Target 1 for a confidence level between "b" and "a", and the third row represents a confidence level between "c" and "b".

Mapping from the confidence factor to the probability of correct classification is needed, since the correct classification is a measure that a human commander can relate to; rather than a confidence measure, which is algorithm dependent and cannot be related to the success or failure of a given mission in the same way as the probability of correct classification. The confusion matrix computed during the classifier training is considered to be a historical measure for the performance of the classifier and is used to fuse its decision with other decisions from other algorithms.

The classification decisions of the statistical processing are mapped to probabilities of correct classification as illustrated by blocks 100, 102, 104 and 106 of FIG. 6. The classification decisions along with the associated probabilities of correct classification on lines 108, 110, 112 and 114 are fused as illustrated in block 116 to produce decisions and a composite probability of correct classification as illustrated by block 118. The fusion process produces feedback signals for the statistical processes as shown by line 120. Confusion matrices are provided for the fusion process as shown by line 124, and the decisions as shown by line 126. Decision-level fusion can be performed using known techniques such as the modified Dempster Shafer process, Bayesian formulation, or other known fusion techniques.

Figure 8:
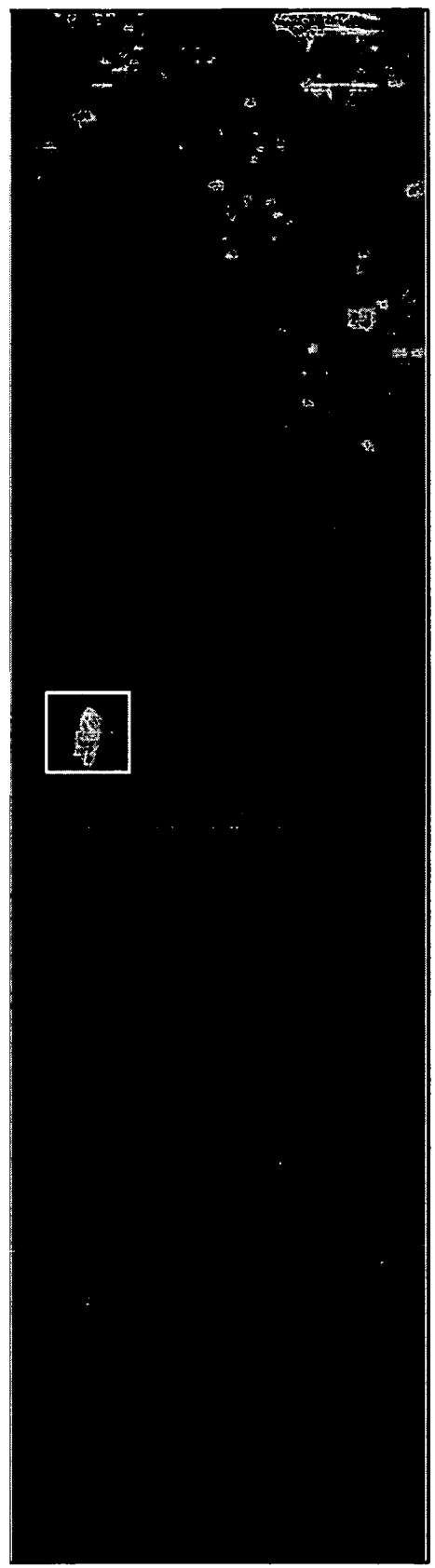
FIG. 8 is an image of a region of interest used to illustrate the use of multiple statistical algorithms within a statistical layer.

FIG. 8 is an image of a region of interest for an example using multiple statistical algorithms within the statistical layer applied to an IR image. Assume that the ground truth for a target in the image of FIG. 8 is an armored vehicle. A neural net statistical process might give the target hypothesis information in Table 10.

TABLE 10

Neural Net Hypotheses

| Target Hypothesis | Probability |
| --- | --- |
| Armor | 0.009543 |
| TEL | 0.000035 |
| Other | 0.590775 |

The addition of a decision tree analysis to the neural net process might give the target hypothesis information in Table 11.

TABLE 11

Neural Net and Decision Tree Hypotheses

| Target Hypothesis | Probability |
| --- | --- |
| Armor | 0.261483 |
| TEL | 0.638517 |

The addition of a fuzzy logic analysis to the decision tree analysis and the neural net process might give the target hypothesis information in Table 12.

TABLE 12

Neural Net, Decision Tree, and Fuzzy Logic Hypotheses

| Target Hypothesis | Probability |
| --- | --- |
| Armor | 0.900000 |

Figure 9:
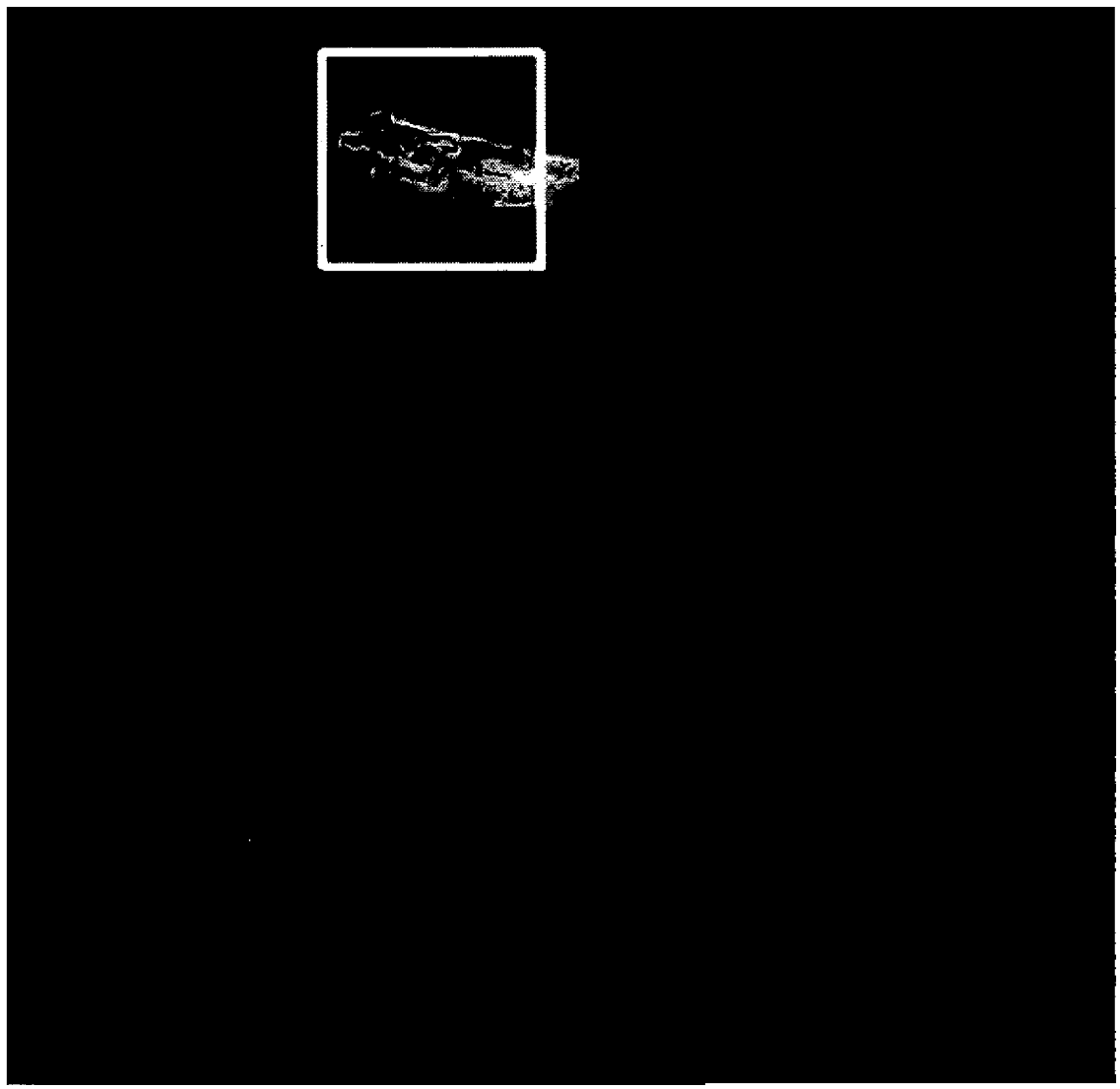
FIG. 9 is an image of a region of interest used to illustrate the use of multiple template algorithms within a template layer.

FIG. 9 is an image of a region of interest for an example using multiple template algorithms within the template layer applied to an IR image. The image of FIG. 9 can be used to illustrate the decisions made by three classifiers in the statistical layer and then fused using the modified Dempster Shafer technique during a field test. Assume that the ground truth for a target in the image of FIG. 9 is a SCUD missile. A region-based template matching process might give the target hypothesis information in Table 13.

TABLE 13

Region-Based Template Matching Hypotheses

| Target Hypothesis | Probability |
| --- | --- |
| BM21 | 0.023896 |
| BMP1 | 0.741840 |
| SCUD | 0.670151 |

An edge-based template matching process might give the target hypothesis information in Table 14.

TABLE 14

Edge-Based Template Matching Hypotheses

| Target Hypothesis | Probability |
| --- | --- |
| BM21 | 0.017604 |
| BMP1 | 0.680098 |
| SCUD | 0.732910 |

A boundary-based template matching process might give the target hypothesis information in Table 15.

TABLE 15

Boundary-Based Template Matching Hypotheses

| Target Hypothesis | Probability |
| --- | --- |
| BM21 | 0.107278 |
| BMP1 | 0.845279 |
| SCUD | 0.523444 |

A segment-based template matching process might give the target hypothesis information in Table 16.

TABLE 16

Segment-Based Template Matching Hypotheses

| Target Hypothesis | Probability |
| --- | --- |
| BM21 | 0.757038 |
| BMP1 | 0.034866 |
| SCUD | 0.652439 |

The decisions made by four templates matching classifiers in the template layer were then fused using the modified Dempster Shafer technique during a field test. The fused results are shown in Table 17.

TABLE 17

Fused Results

| Target Hypothesis | Probability |
| --- | --- |
| BM21 | 0.000203 |
| BMP1 | 0.088299 |
| SCUD | 0.996094 |

The template matching layer includes multiple template matching and decision fusion to produce an output indicating that there has been a template match, or a matching template is not in the template library. This helps to focus the model matching layer. The model matching layer uses a model-based ATC/ATR to provide an output indicating a model match, or that a matching model is not in the model library.

The HAARF is a multi-layered, open system architecture encompassing multiple cooperating target and recognition algorithms of various types. HAARF also couples multiple algorithms including signal-level fusion, pixel-level fusion, feature-level fusion, decision-level fusion, and attribute/model-based reasoning, leading to high performance real-time target detection and recognition. The HAARF's open system/multi-layered architecture allows for the expansion of the target set and the inclusion of best of breed of detection, recognition, and fusion algorithms as they mature with minimal software changes and validation. This is in contrast to existing target detection and recognition systems built as black boxes using a single algorithm approach, which need to be replaced as technology matures.

The HAARF system uses multiple statistical approaches including, for example, neural network, decision tree, and fuzzy logic, and fuses their respective outputs (decision-level fusion) or fuses their features (feature-level fusion). This mitigates the performance issue of individual algorithms and takes advantage of the low throughput requirement of statistical approaches.

The statistical layer generates a set of potential target hypotheses and estimates of the respective aspect angles. The statistical layer then focuses the template layer by only matching the set of templates of the generated hypotheses around the estimated target aspects. This significantly reduces the throughput requirements of template matching and allows the utility of multiple template matching algorithms. For example, one embodiment of the invention uses boundary-based, region-based, segmented boundary, and edge-based template matching. The segmented boundary algorithm is very effective to detect and classify partially obscured targets. The output of these template matching algorithms can be fused to achieve more robust classification.

The template layer further refines the target hypotheses and the corresponding target aspects since template matching decisions are more accurate than statistical classifier decisions. The template layer then focuses the model-based layer to verify the refined target hypotheses at the estimated target aspect (or orientation).

Such focusing mechanism provides model-based performance at low to moderate throughput requirements. HAARF also uses feedback among the model-based, template-based, and statistical layers to prevent any layer from acting as a misleading filter for the successive layers.

The utility of statistical, template matching, and model-based approaches within HAARF provides a significant advantage for handling new targets. For example, if the system has only collected data for new targets, then the system will use its statistical layer to detect and classify the new targets. If the system includes computer aided drawing (CAD) models of the new targets, then the system will use its template layer, and if the system includes faceted models of the targets, then the model-based layer will be used.

The HAARF system includes template and model-based layers, and a focusing mechanism that provides model-based performance with reduced throughput requirements. The HAARF uses a fusion predictor, which optimizes the joint decision probability, yielding statistically optimal performance. The HAARF supports the inclusion of new targets regardless of the type of data available for the new targets. It focuses on reliable target classification using a multi-layered hybrid approach of a statistical, template and model-based architecture.

The HAARF maximizes the synergy among multiple approaches of statistical, template and model-based processing, combining their advantages while avoiding their respective limitations.

The statistical processing, template matching, and model-based processing can be performed using one or more computers or processors programmed to perform various known signal processing algorithms and methods. The processing can be implemented using a layered approach as illustrated in FIG. 2.

While the invention has been described in terms of several embodiments, it will be apparent to those skilled in the art that various changes can be made to the described embodiments without departing from the scope of the invention as set forth in the following claims.

What is claimed is:

1. A method comprising the steps of: producing one or more signals representative of a feature of a target or area of interest;
   statistically processing the signals to produce one or more first hypotheses of the target or area of interest;
   comparing the first hypotheses to one or more templates in a template library to produce one or more second hypotheses, wherein if at least one first hypothesis did not match at least one of the templates, then retrieving at least one additional first hypothesis for comparison with the one or more templates;
   comparing the second hypotheses to one or more models in a model library to produce a target decision, wherein if at least one second hypothesis does not match at least one of the models, then retrieving at least one additional second hypothesis for comparison with the one or more models; and
   outputting the target decision identifying the target.

2. The method of claim 1, where the templates selected for comparison are selected based on the first hypotheses.

3. The method of claim 1, where the models selected for comparison are selected based on the second hypotheses.

4. The method of claim 1, where the step of statistically processing the signals uses one or more of:
   a neural network, a decision tree, and fuzzy logic.

5. The method of claim 1, where the first hypotheses include a target orientation angle.

6. The method of claim 1, where the step of statistically processing the signals uses decision-level fusion.

7. The method of claim 1, wherein the signals are produced using different types of sensors.

8. An apparatus comprising:
   a plurality of sensors for producing one or more signals representative of a feature of a target or area of interest; and
   a processor for statistically processing the signals to produce one or more first hypotheses of the target or area of interest, for comparing the first hypotheses to one or more templates in a template library to produce one or more second hypotheses, wherein if at least one hypothesis did not match at least one of the templates, then retrieving at least one additional first hypothesis for comparison with the one or more templates, and for comparing the second hypotheses to one or more models in a model library to produce a target decision output, wherein if at least one second hypothesis does not match at least one of the models, then retrieving at least one additional second hypothesis for comparison with the one or more models.

9. The apparatus of claim 8, where the templates selected for companson are selected based on the first hypotheses.

10. The apparatus of claim 8, where the models selected for comparison are selected based on the second hypotheses.

11. The apparatus of claim 8, where the processor statistically processes the signals using one or more of:
    a neural network, a decision tree, and fuzzy logic.

12. The apparatus of claim 8, where the first hypotheses include a target orientation angle.

13. The apparatus of claim 8, where the processor statistically processes the signals using decision-level fusion.

14. An apparatus comprising:
    means for producing one or more signals representative of a feature of a target or area of interest; means for statistically processing the signals to produce one or more Image Page 3 first hypotheses of the target or area of interest;
    means for comparing the first hypotheses to one or more templates in a template library to produce one or more second hypotheses, wherein if at least one first hypothesis did not match at least templates, then retrieving at least one additional first hypothesis for comparison with the one or more templates; and
    means for comparing the second hypotheses to one or more models in a model library to produce a target decision output identifying the target, wherein if at least one second hypothesis does not match at least one of the models, then retrieving at least one additional second hypothesis for comparison with the one or more models.

15. The apparatus of claim 14, where the templates selected for companson are selected based on the first hypotheses.

16. The apparatus of claim 14, where the models selected for comparison are selected based on the second hypotheses.

17. The apparatus of claim 14, where the means for statistically processing the signals uses one or more of:

a neural network, a decision tree, and fuzzy logic.

18. The apparatus of claim 14, where the first hypotheses include a target orientation angle.

19. The apparatus of claim 14, where the means for statistically processing the signals uses decision-level fusion.

* * * * *

UNITED STATES PATENT AND TRADEMARK OFFICE
CERTIFICATE OF CORRECTION

PATENT NO. : 7,536,365 B2
APPLICATION NO. : 11/297679
DATED : May 19, 2009
INVENTOR(S) : Omar Aboutalib Page 1 of 1

It is certified that error appears in the above-identified patent and that said Letters Patent is hereby corrected as shown below:

Claims

Claim 8 (Column 12, Line 26)
After "..., wherein if at least one..." insert --first--

Claim 14 (Column 12, Line 51 - 52)
After "...produce one or more..." delete "Image Page 3"

Claim 14 (Column 12, Line 57)
After "...hypothesis did not match at least..." insert --one of the--

Signed and Sealed this

Eighth Day of December, 2009

David J. Kappos
*Director of the United States Patent and Trademark Office*